United States Patent
Naves Arnaldos et al.

(10) Patent No.: US 11,879,174 B2
(45) Date of Patent: Jan. 23, 2024

(54) METHOD FOR PICKLING STEEL SHEETS

(71) Applicant: ArcelorMittal, Luxembourg (LU)

(72) Inventors: Andrea Naves Arnaldos, Barcelona (ES); Elena Piedra Fernandez, Asturias (ES); Vanesa Menendez Delmiro, Asturias (ES); Salome Lopez Gonzalez, Asturias (ES)

(73) Assignee: ArcelorMittal, Luxembourg (LU)

( * ) Notice: Subject to any disclaimer, the term of this patent is extended or adjusted under 35 U.S.C. 154(b) by 780 days.

(21) Appl. No.: 16/756,797

(22) PCT Filed: Dec. 20, 2018

(86) PCT No.: PCT/IB2018/060407
§ 371 (c)(1),
(2) Date: Apr. 16, 2020

(87) PCT Pub. No.: WO2019/123353
PCT Pub. Date: Jun. 27, 2019

(65) Prior Publication Data
US 2020/0270754 A1      Aug. 27, 2020

(30) Foreign Application Priority Data
Dec. 21, 2017 (WO) .................. PCT/IB2017/058271

(51) Int. Cl.
| | |
|---|---|
| C23G 1/08 | (2006.01) |
| B01D 61/14 | (2006.01) |
| C23G 1/36 | (2006.01) |
| C23G 3/02 | (2006.01) |
| C23G 1/02 | (2006.01) |

(52) U.S. Cl.
CPC .............. *C23G 1/08* (2013.01); *B01D 61/145* (2013.01); *C23G 1/02* (2013.01); *C23G 1/081* (2013.01);
(Continued)

(58) Field of Classification Search
CPC . C23G 1/08; C23G 1/02; C23G 1/081; C23G 1/36; C23G 3/021; B01D 61/145;
(Continued)

(56) References Cited

U.S. PATENT DOCUMENTS

| | | | | |
|---|---|---|---|---|
| 3,607,482 A | * | 9/1971 | Selm | ............ C23F 1/46 |
| | | | | 134/13 |
| 5,076,884 A | * | 12/1991 | Aguilar | ............ C23G 1/36 |
| | | | | 134/13 |

(Continued)

FOREIGN PATENT DOCUMENTS

| | | |
|---|---|---|
| AT | 411 575 B | 3/2004 |
| CN | 101519784 | 9/2009 |

(Continued)

OTHER PUBLICATIONS

KR-2013124738-A, Lee, Machine Translation. (Year: 2023).*
(Continued)

*Primary Examiner* — Binh X Tran
*Assistant Examiner* — Christopher Remavege
(74) *Attorney, Agent, or Firm* — Davidson, Davidsion & Kappel, LLC

(57) ABSTRACT

The invention relates to a method for pickling steel sheets 8, the steel sheets being continuously dipped in a pickling bath 1, containing a pickling solution 10, the bath being connected to a treatment unit including a recirculation tank 3, circulators 12 and 13, a continuous entering flow 11 of the solution being fed into an ultrafiltration device 2 from the recirculation tank 3 and two flows exiting the ultrafiltration device, one filtered exiting flow 21 being then fed back inside the recirculation tank 3 and one unfiltered flow 22, the treatment unit including no storage tank.

16 Claims, 1 Drawing Sheet

(52) U.S. Cl.
CPC ............... *C23G 1/36* (2013.01); *C23G 3/021* (2013.01); *B01D 2311/04* (2013.01); *B01D 2311/25* (2013.01)

(58) Field of Classification Search
CPC ............ B01D 2311/04; B01D 2311/25; B01D 2311/263
See application file for complete search history.

(56) References Cited

U.S. PATENT DOCUMENTS

| | | | | |
|---|---|---|---|---|
| 5,207,917 | A * | 5/1993 | Weaver | B01D 65/02 210/671 |
| 5,250,275 | A * | 10/1993 | Pavinato | C23G 1/36 423/150.3 |
| 5,830,282 | A * | 11/1998 | Olashuk | C23G 3/02 118/67 |
| 10,745,812 | B2 * | 8/2020 | Crump | C23G 1/34 |
| 2014/0027379 | A1 * | 1/2014 | Volker | B01D 61/10 210/636 |

FOREIGN PATENT DOCUMENTS

| | | | | |
|---|---|---|---|---|
| CN | 106191890 | | 12/2016 | |
| CN | 106868521 A * | | 6/2017 | ............... C23G 1/36 |
| DE | 41 16 353 | | 11/1992 | |
| DE | 102008062970 | | 7/2010 | |
| DE | 102008062970 A1 * | | 7/2010 | ............... C23F 1/36 |
| FR | 2916205 A1 * | | 11/2008 | ............... C23G 1/36 |
| JP | S5973439 | | 4/1984 | |
| JP | S632814 A | | 1/1988 | |
| JP | 2002320824 | | 11/2002 | |
| JP | 2005105364 | | 4/2005 | |
| JP | 5594123 B2 * | | 9/2014 | |
| KR | 20120070459 A * | | 6/2012 | |
| KR | 2013124738 A * | | 11/2013 | ............... C23G 1/36 |
| RU | 2139594 | | 10/1999 | |
| RU | 2219286 | | 12/2003 | |
| WO | WO-2010060408 A2 * | | 6/2010 | ............... C23F 1/36 |
| WO | WO 2014/36575 | | 3/2014 | |

OTHER PUBLICATIONS

KR-20120070459-A, Choi, Machine Translation. (Year: 2023).*
JP-5594123-B2, Komori, Machine Translation. (Year: 2023).*
DE-102008062970-A1, Koenig, Machine Translation. (Year: 2023).*
WO-2010060408-A2, Koenig, Machine Translation. (Year: 2023).*
CN-106868521-A, He, Machine Translation. (Year: 2023).*
FR 2916205 A1, Crowther, Machine Translation. (Year: 2023).*
International Search Report of PCT/IB2018/060407, dated Apr. 16, 2019.

* cited by examiner

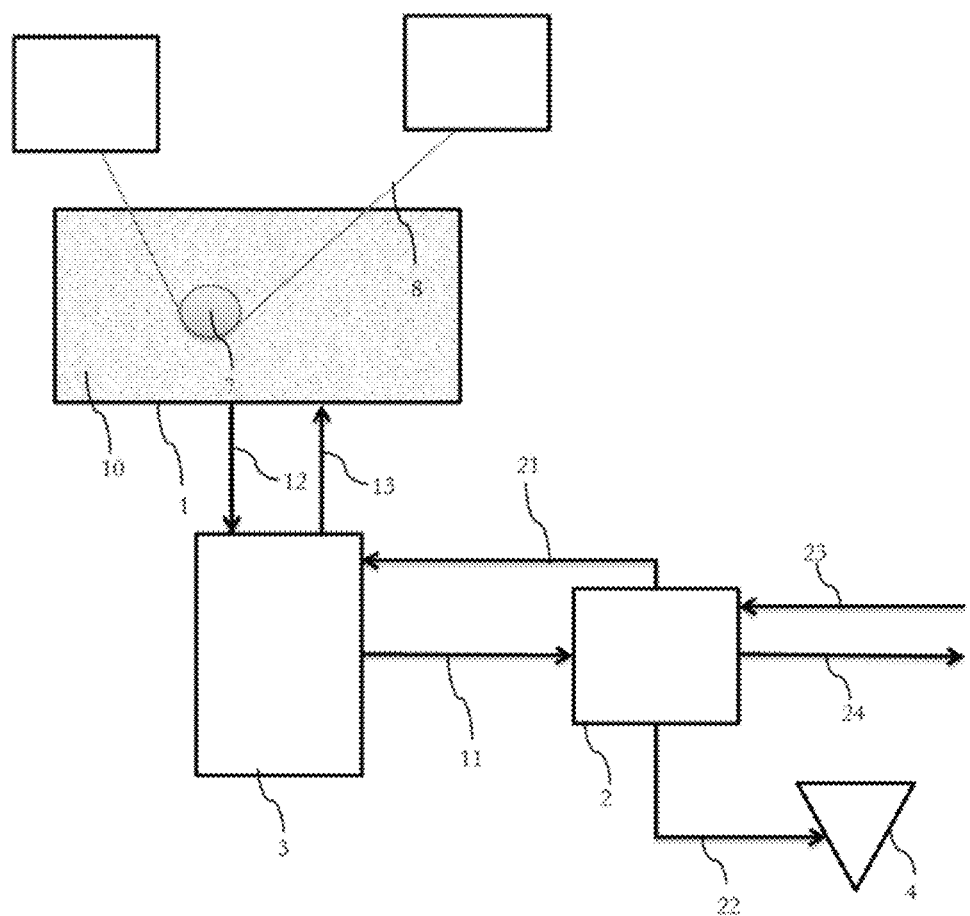

METHOD FOR PICKLING STEEL SHEETS

The present invention relates to a method for pickling steel sheets continuously dipped in a pickling bath containing a pickling solution while said pickling solution is purified.

BACKGROUND

The development of alloys containing more and more elements engenders new problems to be solved. For example, one way to make very high resistance steel among other things is to increase its silicon content. Unfortunately, the alloy elements will contaminate the pickling bath by dissolution during the pickling process. In the case of very high resistance steel, silicon dissolution is a major concern because it leads to the formation of monosilicic acids $Si(OH)_4$ which then condensate to form colloidal silicon and ultimately form suspension and/or co-precipitation with other substances. The silicon dissolved in the pickling and recirculation tanks accumulates and eventually precipitates on the surface of the equipment, notably those downstream, the critical points of accumulation and precipitation are pipes and heat exchangers. In order to remove the precipitates and eliminate the clogging, the pickling process needs to be shut down during the cleaning process.

Moreover, the management of the used acid pickling solution is also a major concern due to its chemical nature, it has to be treated e.g. in an acid regeneration plant or in a wastewater treatment plant.

Patent DE 41 16 353 describes a method for removing amorphous and partially dissolved silicon from a water, acid or alkaline treatment solution, especially a circulating solution for chemical treatment of iron-silicon alloy ribbons. A part of the treatment solution comprising silicon is supplied to a storage container. Said storage container contains a solution that is subjected to a filtration membrane and the filtrate freed of silicon is sent to the treatment solution and the solution comprising a high concentration of silicon is sent to the storage tank and that the highly concentrated in silicon solution in the storage tank is removed and discarded.

Patent WO 2014/36575 describes a method of purification and silica removal from used acid pickling baths. In this method, the resulting pickling solutions are settled in a settling tank and then cleaned in a cross-flow microfilter as a prefilter and in a downstream ultrafilter. Then, the filtrate is fed to spray roaster systems or fluidized bed process of HCl for recovering the corresponding pickling acids and iron oxide.

Patent AT 411 575 relates to a method for purifying contaminated acidic pickling wastewater with the aid of cross-flow microfiltration. In order to do so, the occurring pickling solution is calmed in a settling container and then purified in a cross-flow micro-filter in the temperature range of 10-55° C. Then it is processed according to the spray roasting principle in an acid regeneration plant. This process aims to prevent plant failure as a result of pipe encrustation, filter and nozzle blockages.

SUMMARY OF THE INVENTION

However, by using the above methods and their equipment, the installation requires a lot of space because they are voluminous due to the numerous devices used like, settling tanks and several filtration systems. Moreover, the circuit circulating the pickling acid is not protected against the clogging since the purpose of the above methods is to avoid the contamination of the iron oxide obtained in the acid regeneration plant and not minimize the clogging issue in the circulating circuits.

Consequently, there is a need to find a way to protect the recirculating circuit against the clogging and reduce the footprint of the installation.

The purpose of the invention is to provide a method permitting to avoid or at least slow down the clogging and provide an installation of smaller footprint than those present in the state of the art.

It is an object of the present invention to provide a method for pickling steel sheets, the steel sheets being continuously dipped in a pickling bath, containing a pickling solution, said bath being connected to a treatment unit including a recirculation tank, circulation means and, a continuous entering flow of said solution being fed into an ultrafiltration device from the recirculation tank and two flows exiting the ultrafiltration device, one filtered exiting flow being then fed back inside said recirculation tank and one unfiltered flow, said treatment unit including no storage tank.

Another object is to provide an equipment comprising a pickling bath, a system continuously dipping steel sheets in said pickling bath and a treatment unit including a recirculation tank, at least an ultrafiltration device, pipes connecting said recirculation tank and tap water input and backwashing solution output and pumps, said treatment unit including no storage tank and the eventual treatment for the unfiltered flow.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following figure:

FIG. 1 is a schematic illustration of the installation.

DETAILED DESCRIPTION

The invention relates to a method for pickling steel sheets 8, said steel sheets being continuously dipped in a pickling bath 1, containing a pickling solution 10, said bath being connected to a treatment unit including a recirculation tank 3, circulation means 12 and 13, a continuous entering flow 11 of said solution being fed into an ultrafiltration device 2 from the recirculation tank 3 and two flows exiting the ultrafiltration device, one filtered exiting flow 21 being then fed back into said recirculation tank 3 and one unfiltered flow 22, said treatment unit including no storage tank.

In the prior art, the clogging of the recirculation system is not dealt with. With the method according to the present invention, it seems that the clogging is slowed down which apparently prolonged the lifetime of recirculating system, i.e. pumps, nozzles, pipes and valves.

Moreover, compared to the closest prior art, the pickling method according to the present method does not use a storage tank. This enables the present method to minimize the polymerization kinetics rate of colloidal silicon leading to a decrease of the fouling tendency of the membrane.

Preferably, said pickling solution 10 is made of one or a combination of different acids. For example, hydrochloric acid at 15% is in the pickling bath 1 or a mix of hydrochloric acid and sulphuric acid.

Preferably, said pickling solution 10 is not treated thermically before being fed into said ultrafiltration device. It seems that it permits to immediately treat the pickling acid and also requires less space.

Preferably, neither additive, nor device is used to increase the degree of polymerization of said solution being fed into said ultrafiltration device. However, in the previous patents, the acidic pickling wastewater is settled in a tank increasing the degree of polymerization and thus permitting to obtain bigger particles. This settling process presented in the previous patent seems to ease the filtration due to a global increase of the particle size to be filtered. Consequently, the removal rate achieved is above 99% in the case of the patent WO 2014/36575 and 75% for AT 411 575. On the contrary, the present invention has apparently the major advantage of drastically slowing down the clogging with a removal rate of only 40% of the total silicon content in the used pickling acid solution. So the objective is achieved but the space required is reduced.

Preferably, the ultrafiltration device 2 is a cross-flow ultrafiltration device. In the case of a cross-flow filtration, it is believed that contrary to a dead-end filtration, the flow is applied tangentially across the membrane surface. Without willing to be bound by any theory, as feed flows across the membrane, the filtrate passes through the holes of the membrane while the unfiltered flow exits at the opposite end of the membrane. Apparently, the tangential flow of the membrane creates a shearing effect on the surface of the membrane, which in turn reduces fouling.

Preferably, the used acid pickling is circulated using pumps. The pumps are protected by a cartridge filter permitting filtering of the suspended solids.

Preferably, the ultrafiltration device 2 has one or several membranes. Preferably, the membrane of the ultrafiltration device 2 is made of ceramic.

Preferably, the membrane of the ultrafiltration device 2 has a pore size comprised between 1 and 10 nm. For example, the membrane has a pore size of 7 nm.

Preferably, the continuous flow has a silicon content of at least 60 mg·L$^{-1}$, more preferably of 100 mg·L$^{-1}$ and even more preferably of 150 mg·L$^{-1}$. Apparently, the present invention has also the advantageous effect of being more efficient with higher silicon concentration because more colloidal silicon is present and thus facilitates the filtration. Without willing to be bound by any theory, this technology assures a rejection rate of 100% of colloidal and suspended matter bigger than the membrane pore size.

Preferably, the continuous flow 11 of said solution is fed into the ultrafiltration device at a flow rate comprised between 5 and 50 m$^3$·h$^{-1}$, preferably between 15 and 30 m$^3$·h$^{-1}$, permitting to renew between 1 and 10 times per hour the acid volume present in recirculation tank, preferably 4 times per hour.

Preferably, the purified exiting flow is comprised between 50 and 95%, more preferably between 65 and 85%, of the flow of said solution being fed into an ultrafiltration device.

Preferably, the ultrafiltration system is backwashed to clean the membrane. For example, the ultrafiltration system is backwashed every 8 minutes by a flow of tap water 24 and the tap water flow used to clean the membrane 23 exits said ultrafiltration device.

It is also possible that the ultrafiltration device is composed of several cross-flow ultrafiltration devices. For example, the ultrafiltration device is composed of two cross-flow ultrafiltration devices.

Preferably, the unfiltered flow, i.e. concentrated in silicon, exiting the ultrafiltration system (2) is treated. Preferably, this treatment can be done in a decanter or a hydrocyclone. After this treatment, the purified flow, i.e. having the lowest silicon concentration, can be fed back to the recirculation tank 3 or the ultrafiltration device 2. Preferably, the flow having the highest silicon concentration exiting the treatment device can be sent to an acid regeneration plant or to wastewater treatment 4.

The invention also relates to an equipment comprising a pickling bath 1, a system continuously dipping steel sheets in said pickling bath and a treatment unit including a recirculation tank 3, at least an ultrafiltration device 2, pipes connecting said recirculation tank and tap water input 24 and backwashing solution output 23 and pumps, said treatment unit including no storage tank and the eventual treatment 4 for the unfiltered flow 22.

EXAMPLES

Example 1

The recirculation tank 3 contains 60 m$^3$ of hydrochloric acid at 15% having a silicon content of roughly 59 mg·L$^{-1}$. The acid pickles different steel grades, e.g.: interstitial steel, medium carbon, HSLA and dual phase steels. The used pickling acid is sent by pumps to the ultrafiltration device at a flow of 17 m$^3$·h$^{-1}$. The ultrafiltration device 2 is made of 68 m$^2$ of ceramic membrane area having a pore size of 7 nm (10 kDa Molecular Weight). A flow of 14 m$^3$·h$^{-1}$ of filtered flow containing 38 mg·L$^{-1}$ of silicon is fed back inside the bath while a flow of 3 m$^3$·h$^{-1}$ of unfiltered flow containing 157 mg·L$^{-1}$.

|  | Flow rate [m$^3$·h$^{-1}$] | Si concentration [mg·L$^{-1}$] | Colloidal and suspended matter > 7 nm |
|---|---|---|---|
| Entering flow | 17 | 59 | 100 |
| Filtered flow | 14 | 38 | 0 |
| Unfiltered flow | 3 | 157 | 100 |

What is claimed is:

1. A method for pickling steel sheets, the method comprising:
   continuously dipping steel sheets in a pickling bath containing a pickling solution, the pickling bath being connected to a treatment unit including a recirculation tank, at least one circulator, a continuous entering flow of the pickling solution being fed into an ultrafiltration device from the recirculation tank and two flows exiting the ultrafiltration device, the two flows including one filtered exiting flow fed back into said recirculation tank and one unfiltered flow, the treatment unit including no storage tank.

2. The method as recited in claim 1 wherein the pickling solution is made of one or a combination of different acids.

3. The method as recited in claim 1 wherein the pickling solution is not treated thermically before being fed into the ultrafiltration device.

4. The method as recited in claim 1 wherein neither an additive nor a device is used to increase a degree of polymerization of the pickling solution fed into the ultrafiltration device.

5. The method as recited in claim 1 wherein the ultrafiltration device is a cross-flow ultrafiltration device.

6. The method as recited in claim 1 wherein the ultrafiltration device has at least one membrane.

7. The method as recited in claim 6 wherein the membrane is made of ceramic.

8. The method as recited in claim 6 wherein the membrane has a pore size comprised between 1 and 10 nm.

9. The method as recited in claim 1 wherein the continuous entering flow of the pickling solution is fed into the ultrafiltration device at a flow rate between 5 and 50 $m^3 \cdot h^{-1}$, so as to allow renewal of an acid volume in the recirculation tank of between 1 and 10 times per hour.

10. The method as recited in claim 1 wherein the filtered exiting flow is between 50 and 95% of the continuous entering flow of the pickling solution being fed into the ultrafiltration device.

11. The method as recited in claim 1 wherein the continuous entering flow has a silicon content of at least 60 $mg \cdot L^{-1}$.

12. The method as recited in claim 1 wherein the ultrafiltration device includes several cross-flow ultrafiltration devices.

13. The method as recited in claim 1 further comprising backwashing the ultrafiltration system to clean the membrane.

14. The method as recited in claim 1 wherein the unfiltered flow is concentrated in silicon, and further comprising treating the unfiltered flow exiting the ultrafiltration system.

15. An equipment comprising:
a pickling bath;
a transporter continuously dipping steel sheets in the pickling bath;
a treatment unit including a recirculation tank having an inlet and an outlet connected to the pickling bath, a further outlet of the recirculation tank connected to an inlet of an ultrafiltration device, a first outlet of the ultrafiltration device connected to a further inlet of the recirculation tank and a second outlet of the ultrafiltration device being provided for an unfiltered flow, the treatment unit including no storage tank.

16. The equipment as recited in claim 15 wherein the second outlet is connected to a wastewater treatment.

* * * * *